United States Patent
Fujimura et al.

(10) Patent No.: US 7,366,325 B2
(45) Date of Patent: Apr. 29, 2008

(54) MOVING OBJECT DETECTION USING LOW ILLUMINATION DEPTH CAPABLE COMPUTER VISION

(75) Inventors: Kikuo Fujimura, Palo Alto, CA (US); Xia Liu, Waterloo (CA)

(73) Assignee: Honda Motor Co., Ltd., Tokyo (JP)

( * ) Notice: Subject to any disclaimer, the term of this patent is extended or adjusted under 35 U.S.C. 154(b) by 603 days.

(21) Appl. No.: 10/964,299

(22) Filed: Oct. 12, 2004

(65) Prior Publication Data

US 2005/0100192 A1    May 12, 2005

Related U.S. Application Data

(60) Provisional application No. 60/510,179, filed on Oct. 9, 2003.

(51) Int. Cl.
*G06K 9/00*    (2006.01)

(52) U.S. Cl. .................... 382/104; 382/106; 382/154; 382/181

(58) Field of Classification Search ............... 382/104, 382/106, 154, 181, 225; 340/426.22–33, 340/435–437, 901, 907; 701/301–302; 348/169
See application file for complete search history.

(56) References Cited

U.S. PATENT DOCUMENTS

| | | | |
|---|---|---|---|
| 4,607,622 A | 8/1986 | Fritch et al. | |
| 5,414,439 A | 5/1995 | Groves et al. | |
| 5,729,016 A | 3/1998 | Klapper et al. | |
| 5,850,470 A | 12/1998 | Kung et al. | |
| 5,987,154 A | 11/1999 | Gibbon et al. | |
| 6,049,619 A | 4/2000 | Anandan et al. | |
| 6,104,835 A | 8/2000 | Han | |
| 6,181,805 B1 | 1/2001 | Koike et al. | |
| 6,327,522 B1* | 12/2001 | Kojima et al. | ............. 701/1 |
| 6,411,328 B1 | 6/2002 | Franke et al. | |
| 6,420,704 B1 | 7/2002 | Berenz et al. | |
| 6,421,463 B1 | 7/2002 | Poggio et al. | |
| 6,445,832 B1 | 9/2002 | Lee et al. | |
| 6,535,114 B1* | 3/2003 | Suzuki et al. | ........... 340/435 |
| 6,553,130 B1* | 4/2003 | Lemelson et al. | ........ 382/104 |
| 6,580,373 B1 | 6/2003 | Ohashi | |
| 6,590,521 B1 | 7/2003 | Saka et al. | |
| 6,718,049 B2 | 4/2004 | Pavlidis et al. | |

(Continued)

OTHER PUBLICATIONS

Xu, Fenglian, et al., "Pedestrian Detection and Tracking with Night Vision".

(Continued)

*Primary Examiner*—Bhavesh M. Mehta
*Assistant Examiner*—John B Strege
(74) *Attorney, Agent, or Firm*—Fenwick & West LLP; Mark E. Duell (57) ABSTRACT

Moving object detection is based on low illumination image data that includes distance or depth information. The vision system operates on a platform with a dominant translational motion and with a small amount of rotational motion. Detection of moving objects whose motions are not consistent with the movement of the background is complementary to shape-based approaches. For low illumination computer-based vision assistance a two-stage technique is used for simultaneous and subsequent frame blob correspondence. Using average scene disparity, motion is detected without explicit ego-motion calculation. These techniques make use of characteristics of infrared sensitive video data, in which heat emitting objects appear as hotspots.

18 Claims, 6 Drawing Sheets

U.S. PATENT DOCUMENTS

| | | | |
|---|---|---|---|
| 6,731,436 B2 | 5/2004 | Ishii et al. | |
| 6,751,342 B2 | 6/2004 | Shepard | |
| 6,775,411 B2 | 8/2004 | Sloan et al. | |
| 6,803,574 B2 | 10/2004 | Abel et al. | |
| 6,808,200 B2 | 10/2004 | Abel et al. | |
| 6,815,680 B2 | 11/2004 | Kormos | |
| 6,823,241 B2 | 11/2004 | Shirato et al. | |
| 6,828,544 B2 | 12/2004 | Stephan et al. | |
| 2003/0035051 A1 | 2/2003 | Cho et al. | |
| 2003/0053664 A1 | 3/2003 | Pavlidis et al. | |
| 2006/0177097 A1* | 8/2006 | Fujimura et al. | 382/103 |

OTHER PUBLICATIONS

Liu, Xia, et al., "Pedestrian Detection Using Stereo Night Vision", pp. 1-10, IEEE Transactions on Vehicular Technology, pp. 1657-1665, vol. 53-6, Nov. 2004.

PCT International Search Report and Written Opinion, PCT/US04/33973, Sep. 19, 2006.

A. Baumberg and D. Hogg, "Learning Flexible Models From Image Sequences," *European Conference on Computer Vision*, vol. 1, 1994, pp. 299-308.

A. Broggi et al., "Shape-Based Pedestrian Detection," *Proceedings of the IEEE Intelligent Vehicles, Symposium*, Dearborn (MI), USA, Oct. 2000, pp. 215-220.

Q. Cai and J. K. Aggarwal, "Tracking Human Motion in Structured Environments Using a Distributed-Camera System," *IEEE Transactions on Pattern Analysis and Machine Intelligence*, 21(12), Nov. 1999, pp. 1241-1247.

Y. Cheng, "Mean Shift, Mode Seeking, and Clustering," *IEEE Transactions on Pattern Analysis and Machine Intelligence*, 17(8), 1995, pp. 790-799.

D. Comaniciu et al., "Real-Time Tracking of Non-Rigid Objects Using Mean Shift," *Proc. IEEE Conf. On Computer Vision and Pattern Recognition*, vol. 2, Jun. 13-15, 2000, pp. 142-149.

R. Cutler and L. Davis, "Robust Real-Time Periodic Motion Detection, Analysis, and Applications," *IEEE Transaction on Pattern Analysis and Machine Intelligence*, 22(8), Aug. 2000, pp. 781-796.

T. Darrell et al., "Integrated Person Tracking Using Stereo, Color, and Pattern Detection," *IEEE Conference on Computer Vision and Pattern Recognition*, 1998, pp. 1-8.

J. Deutscher et al., "Articulated Body Motion Capture by Annealed Particle Filtering," *Proc. IEEE Conf. On Computer Vision and Pattern Recognition*, vol. 2, 2000, pp. 126-133.

U. Franke et al., "Autonomous Driving Goes Downtown," *IEEE Intelligent Systems*, Nov./Dec. 1998, pp. 32-40.

D. M. Gavrila and V. Philomin, "Real-Time Object Detection for 'Smart' Vehicles," *Proc. of IEEE International Conference on Computer Vision*, 1999, 6 pages.

I. Haritaoglu et al., "Backpack: Detection of People Carrying Objects Using Silhouettes," *International Conference on Computer Vision*, Sep. 1999, 6 pages.

I. Haritaoglu et al., "W4: Real-Time Surveillance of People and Their Activities," *IEEE Transactions on Pattern Analysis and Machine Intelligence*, 22(8), Dec. 2000, pp. 809-830

Haykin, Simon, "Adaptive Filter Theory," Third Edition, Prentice Hall, Inc., New Jersey, 1996, pp. 302-334.

B. Heisele et al., "Face Recognition With Support Vector Machines: Global Versus Component-Based Approach," *IEEE International Conference on Computer Vision*, 2001, pp. 688-694.

I. Kakadiaris and D. Metaxas, "Model-Based Estimation of 3D Human Motion," *IEEE Transactions on Pattern Analysis and Machine Intelligence*, 22(12), Dec. 2000, pp. 1453-1459.

A. Mohan and T. Poggio, "Example-Based Object Detection in Images by Components," *IEEE Transactions on Pattern Analysis and Machine Intelligence*, 23(4), Apr. 2001, pp. 349-361.

C. Papageorgiou et al., "A Trainable Pedestrian Detection System," *Proc. Of Intelligent Vehicles*, Oct. 1998, pp. 241-246.

M. Oren et al., "Pedestrian Detection Using Wavelet Templates," IEEE *Proc. On Computer Vision and Pattern Recognition*, 1997, pp. 193-199.

E. Osuna et al., "Training Support Vector Machines: an Application to Face Detection," *Computer Vision and Pattern Recognition*, 1997, pp. 130-136.

R. Polana and R. Nelson, "Low Level Recognition of Human Motion," *Workshop on Motion of Non-Rigid and Articulated Objects*, Oct. 1994, pp. 77-82.

Y. Ricquebourg and P. Bouthemy, "Real-Time Tracking of Moving Persons by Exploiting Spatio-Temporal Image Slices," *IEEE Transaction on Pattern Analysis and Machine Intelligence*, 22(8), Aug. 2000, pp. 797-808.

K. Rohr, "Incremental Recognition of Pedestrians From Image Sequences," *Proc. Computer Vision and Pattern Recognition*, 1993, pp. 8-13.

S. Romdhani et al., "Computationally Efficient Face Detection," *IEEE International Conference on Computer Vision*, 2001, pp. 1-7.

H. Sawhney et al., "Independent Motion Detection 3D Scences," *IEEE Transactions on Pattern Analysis and Machine Intelligence*, 22(10), Oct. 2000, pp. 1191-1199.

Y. Song et al., "Towards Detection of Human Motion," *IEEE Conf. On Computer Vision and Pattern Recognition*, 2000, pp. 810-817.

V. Vapnik, "Statistical Learing Theory," *Springer*, 2000, pp. 24-25.

G. Welch and G. Bishop, "An Introduction to the Kalman Filter," University of North Carolina at Chapel Hill, Department of Computer Science, Chapel Hill, NC, TR95-041.

L. Zhao and C. Thorpe, "Stereo and Neural Network-Based Pedestrian Detection," *Proc. Int'l. Conf. On Intelligent Transportation Systems*, Oct. 1999, 6 pages.

Liu, Xia, et al., "Pedestrian Detection Using Stereo Night Vision," *IEEE Transactions on Vehicular Technology*, vol. 53-6, Nov. 2004, pp. 1657-1665.

Xu, Fengliang, et al., "Pedestrian Detection and Tracking with Night Vision," *IEEE Transactions on Intelligent Transportation Systems*, vol. 5, No. 4, 2004, pp. 1-10.

* cited by examiner

MOVING OBJECT DETECTION USING LOW ILLUMINATION DEPTH CAPABLE COMPUTER VISION

RELATED APPLICATIONS

This application is related to and claims priority from U.S. Provisional Patent Application Ser. No. 60/510,179 titled "Pedestrian Detection Using Stereo Night Vision" and filed on Oct. 9, 2003 by the same inventors, which is incorporated herein by reference in its entirety.

FIELD OF THE INVENTION

The present invention relates generally to real-time computer vision and more particularly to low illumination computer based recognition of moving objects from a moving platform.

BACKGROUND OF THE INVENTION

Computer vision is used to assist or perform humans in performing many functions. Computer vision can be more accurate and better suited than human vision in many applications. For example, computer vision for surveillance applications can better detect moving objects and recognize shapes for indefinite periods of time simply using a set of cameras in conjunction with various computer algorithms (e.g., background subtraction).

Some applications require a computer vision system able to operate from a moving platform. Such a system needs to deal with additional factors due to the system's own motion. Conventional approaches for these applications rely on mobile cameras and other hardware/software with computer based algorithms. Some commonly used algorithms include, for example, pattern classifiers such as Support Vector Machine ("SVM"), neural nets for shape identification, motion patterns such as periodicity, probabilistic modeling of pose as well as chamfer distance calculation, plane and parallax decomposition, and the like. All these conventional techniques can be used to identify objects of interest in a moving scene. In general, in these approaches the static scene viewed by a moving camera has a motion induced by the movement of the system. These methods are based on the observation that moving objects have movements that are not consistent with that of the background. After compensating for the system-induced motion, the remaining motion must come from independently moving objects. However, one drawback of these approaches for use in real-time vision systems is that they often involve explicit ego-motion computation or a motion/flow constraint. Ego-motion calculations are computationally expensive and severely impact the performance of real-time vision systems.

Other applications require a computer vision system able to operate under low illumination conditions. The assistance of computer vision in low illumination conditions is particularly important for humans because human vision is weaker at night or under low illumination conditions. Conventional approaches to night vision systems generally rely on infrared-sensitive cameras. The appearance of the scene taken at night by an infrared-sensitive camera is quite different from that taken by a regular camera during daytime. Because infrared cameras are heat sensitive, heat-emitting objects appear brighter than surrounding objects. For example, for human detection applications, most approaches exploit the heat-emitting characteristic of human bodies in conjunction with infrared-sensitive cameras. Conventional techniques used in infrared night vision applications include probabilistic templates for pedestrians, appearance-based learning, shape-based comparison, methods using symmetry, histograms, and the like.

One important application of computer night vision from a moving platform is pedestrian detection systems in vehicular applications. Pedestrian detection methods use multiple steps to locate the pedestrian in the scene. These methods generally operate by finding a large number of candidates for human-like blobs in the scene. Then, these candidates are filtered into human and non-human categories based on certain criteria such as location, size, and road information. For example, one such approach to pedestrian detection is described in "Pedestrian Detection and Tracking with Night Vision," F. Xu and K. Fujimura, Proc. of the IEEE Trans. on Intelligent Vehicles Symposium, Versailles, France (June 2002), incorporated herein by reference in its entirety. However, the filtering process is complicated and subject to failure because in practice it is difficult to enumerate all possible shapes humans can take. Also, from the viewpoint of automotive safety, it is important to detect moving objects that cross the vehicle's path, regardless of whether that is a human or some other object.

Thus, there is a need for moving object detection systems and methods for operating under low illumination conditions and from a moving platform that (1) can detect moving objects with any shape and (2) do not require complicated ego-motion calculations.

SUMMARY OF THE INVENTION

A system and method makes use of scene motion to detect moving objects in the path of a moving platform. The static scene viewed by a moving imaging subsystem has a motion induced by the movement of the platform on which the system resides. After compensating for the platform-induced motion, the remaining motion must come from independently moving objects in the scene. These techniques are based in part on the observation that independently moving objects have movements that are not consistent with that of the background scene.

Accordingly, in one embodiment, a computer vision system for detecting moving objects from a moving platform includes an imaging subsystem, a computing subsystem, and an output subsystem. The imaging subsystem captures scene image data at different times. The image data includes information for deriving depth or distance for objects in the scene. The imaging subsystem is configured for operation under low illumination conditions. In one embodiment, the imaging subsystem includes two, or possibly more, infrared-sensitive cameras.

The computing subsystem is communicatively coupled to the imaging subsystem for the transmission of the image data. The computing subsystem is configured to provide motion detection data based on the calculation of the average scene disparity. The motion detection data indicates the detection of independently moving objects within the scene. The motion detection data is output to the output subsystem.

The output subsystem is coupled to the computing subsystem for receiving the motion detection data. The output subsystem in turn provides a motion detection signal in response to the detection of one or more independently moving objects.

In one embodiment, the computing subsystem also includes an input/output ("I/O") module for receiving the image data from the imaging subsystem. The I/O module connects to an image processing module and a motion detection module. The image processing module receives the image data through the I/O module. The image processing module is configured to derive three-dimensional coordinates for the objects captured in the image data. Those coordinates are transferred to the motion detection module for detecting moving objects. The motion detection module detects moving objects based, at least in part, on a comparison of an estimated object shift and actual object shift. The estimated value is derived from the average scene disparity while the actual value is derived from changes in the three-dimensional coordinates for the same object between earlier and subsequent frames.

In addition, according to one embodiment, a computer based method for detecting moving objects from a moving platform under low illumination conditions includes multiple steps. The method includes capturing image data of a scene from a moving platform at two or more points in time. The image data includes low illumination imaging information and depth related information. The method also includes processing the image data to determine three-dimensional coordinates for points corresponding to various objects in the scene. Further, according to this embodiment, the method includes calculating an average scene disparity from changes in the three-dimensional coordinates objects in the scene that are likely to be stationary.

The average scene disparity is used to calculate an estimated position shift for each possible target object in the scene induced by the moving platform. The average scene disparity is used for classifying moving objects from stationary objects. For these objects, the actual position shift is also calculated with the three-dimensional coordinates for the objects in two frames, each frame taken at a different point in time. With the actual and estimated position shifts, a position error for each candidate object is calculated. Based on an empirically determined maximum threshold value for the position shift error, moving objects are detected if their position error exceeds the maximum threshold. In one embodiment, the maximum threshold value is based, at least in part, on the speed of the moving objects and the distance of the moving objects to the moving platform.

This approach bypasses explicit ego-motion computation based on a simplified formula that computes the average scene disparity of stationary objects. This approach is particularly useful when the image capturing subsystem or platform has one dominant motion, which for example is the case for the vehicle movement.

In one embodiment, the image data includes frames of the scene taken at two points in time with infrared sensitive information. In this embodiment, the image data is processed by thresholding each frame to find blobs of pixels corresponding to heat emitting objects or hotspots in the scene. The blobs found in the earlier frame are matched with blobs found in the subsequent frame for corresponding heat emitting objects. Then, for each blob, a three-dimensional coordinate set for a point in the blob is determined.

In one embodiment, a two-stage correspondence matching approach is used for stereo image processing of low illumination image data. By using a coarse-to-fine strategy, stereo correspondence is achieved at a faster rate than traditional methods such as sum-of-squared differences ("SSD") and multi-resolution approaches. The first stage is based on the comparison of blob area and other blob features for each blob located in a similar location within each of the frames. The second stage is based on gray level template analysis. Gray level information in the image data for blobs in similar locations in the two frames is compared to determine whether they match.

Additionally, in one embodiment, after moving objects are detected, the type of object of interest can be distinguish from other possibly-moving objects.

In an alternative embodiment, a pedestrian detection system is configured to assist a driver to detect pedestrians and other moving objects in the path of the vehicle during low illumination conditions. The pedestrian detection system includes an infrared stereo vision module, a data processing module, and an output interface module. The infrared stereo vision module is configured to capture scene image data at different times. The image data includes information related to depth or distance for the objects in the scene. The infrared stereo vision module includes two, or possibly more, infrared-sensitive cameras configured to operate under low illumination conditions.

The data processing module is connected to the infrared stereo vision module for receiving the image data it captures. The data processing module is configured to provide motion detection data based on the calculation of the average stationary scene disparity. The motion detection data indicates the detection of independently moving objects within the scene.

In addition, the output interface is coupled to the data processing module for receiving the motion detection data. The output interface module is configured for providing an output signal to a safety system processing unit within the vehicle. The output signal is intended for providing an alert signal to the driver in response to the detection of one or more pedestrians in the vehicle's path.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1:
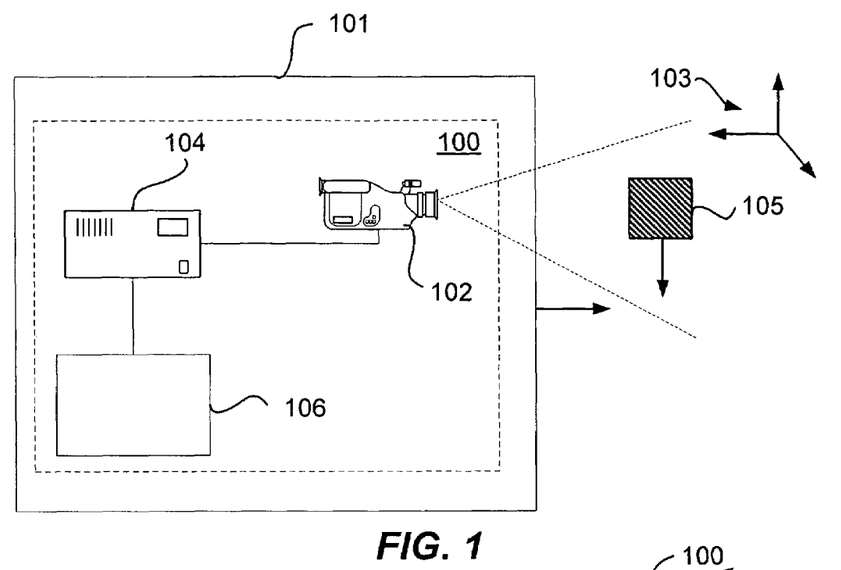
FIG. 1 is a block diagram of one embodiment of a computer vision system on a moving platform.

Referring now to Figure ("FIG.") 1, one embodiment of a computer vision system 100 on a moving platform 101 is shown. The moving platform 101 moves with respect to a background or frame of reference 103. The computer vision system 100 includes an imaging subsystem 102, a computing subsystem 104, and an output subsystem 106. The imaging subsystem 102 captures the image data for processing by the computing subsystem 104. The computing subsystem 104 is connected to the imaging subsystem 102 to receive the image data as input. The computing subsystem 104 implements image processing algorithms to detect moving objects 105 with movement with respect to the background or common frame of reference 103. The motion detection information is provided as output of the computing subsystem 104 to the output subsystem 106. The output subsystem 106 receives the motion detection information and provides an output signal.

Moving platform 101 includes a motion enabling mechanism, e.g., wheels, rail, motor, or the like, and mounting hardware for mounting the computer vision system 100 or components thereof. For example, motorized vehicles of any size can be used to mount cameras for providing image data to a computing subsystem. In one embodiment, moving platform 101 includes the imaging subsystem 102 that is wirelessly coupled to the computing subsystem 104. In another embodiment, the moving platform 101 is a conventional passenger automobile with a pedestrian detection safety system according to the present invention. Other embodiments include other multi-wheeled vehicles, such as motorcycles, light trucks, cargo trucks, and the like.

The imaging subsystem 102 includes the capability of capturing image data under low illumination conditions. For example, infrared-sensitive cameras, time-of-flight cameras, or the like are included in the imaging subsystem 102. These types of camera systems capture electromagnetic radiation at wavelengths outside the visible light spectrum and therefore can operate under low illumination conditions, e.g., at night. Accordingly, in one embodiment, the computer vision system 100 is configured for night vision operation, e.g., night time surveillance, night vision driver assistance, or the like.

Moreover, the imaging subsystem 102 includes means for providing information related to depth or distance of the imaged objects, e.g., a dual camera stereo vision system, a depth sensing camera, or the like. These types of camera systems provide information regarding the distance from the camera to the objects in the scene, either directly, as for example pixel depth data, or indirectly, as for example with stereo image data. For example, in one embodiment, a stereo vision system provides left and right images of the same scene from which distance to objects appearing in both images is calculated by conventional stereo vision techniques. Alternatively, in another embodiment, a depth-sensing system provides pixel-by-pixel depth information (in addition to other image related data, e.g., color, intensity, and the like). In this embodiment, distance from each object to the camera is directly available from the pixels corresponding to the object within the image data itself, e.g., average depth value for those pixels.

For processing the image data, the imaging subsystem 102 is connected to the computing subsystem 104. This connection is a conventional data communications connection capable of transferring the image data, either wired or wireless and either for digital or analog signals. For example, in one embodiment, the imaging subsystem 102 includes a wireless transmitter to transmit digital image data to a wireless receiver associated with the computing subsystem 104. In an alternative embodiment, the imaging subsystem 102 includes cable connections from the one or more cameras directly to the computing subsystem 104 carrying analog video signals digitized by the computing subsystem 104 upon input.

The computing subsystem 104 includes several computing modules that make use of scene motion algorithms to detect moving objects in the path of the moving platform 101. Because the imaging subsystem 102 is on a moving platform 101, the static scene viewed by the moving imaging subsystem 102 has a motion induced by the movement of the system, i.e., platform-induced motion. After compensating for the platform-induced motion, the remaining detected motion corresponds to objects that are themselves moving within the scene.

To compensate for the platform-induced motion, the computing subsystem 104 computes an average stationary scene disparity, which is an average location disparity for stationary objects in the scene. The average scene disparity provides an estimate of the average object shift in the image induced by the moving system. Objects that exceed an estimated maximum object shift based on the average scene disparity are classified as moving objects as opposed to stationary objects. Stationary objects appear in the subsequent frame within the maximum object shift. Once objects are classified as moving or stationary, the computing subsystem 104 generates motion detection output data.

The motion detection output data of the computing subsystem 104 is received by the output subsystem 106. For example, in one embodiment, the motion detection output data of the computing subsystem 104 includes the image data received from the imaging subsystem 102 and data identifying moving objects in the images, e.g., coordinates for the location of moving objects in the images. The output subsystem 106 provides an output signal that relates to the motion detection output data. For example, in one embodiment, a video signal that includes outlines around moving objects is displayed in a conventional computer display system, e.g., CRT monitor, flat screen, or the like. In an alternative embodiment, an audible signal is provided informing a user of the presence of a moving object as detected by the computer vision system 100. In yet another embodiment, the output subsystem 106 provides a detection output signal to a vehicle safety system, for example, to reduce the speed of the vehicle in response to the detection of a moving object in the vehicle's path.

Figure 2:
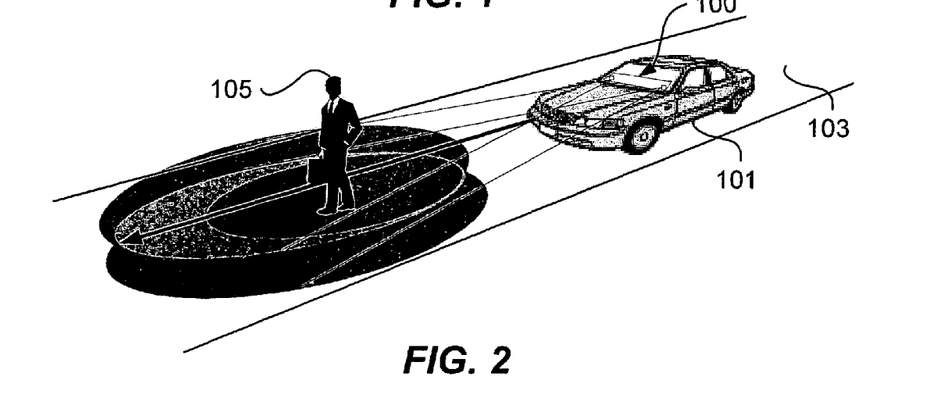
FIG. 2 shows one exemplary embodiment of an application of a computer vision system for a vehicle safety system.

Now referring to FIG. 2, one exemplary embodiment of an application of a computer vision system 100 for a vehicle safety system is shown. In this embodiment, the moving platform 101 is a vehicle. The vehicle 101 moves with respect to a road 103. The imaging subsystem 102 in this embodiment includes a dual infrared-sensitive camera video system 102 for stereo night vision. The cameras are mounted in the front section of the vehicle, e.g., on the vehicle's dashboard, on or about the rear view mirror, or on a similar location. The imaging subsystem 102 connects to a controller device 104 within the vehicle's engine compartment. The output subsystem 106 includes a lighted display in the vehicle's dashboard prominently located within the driver's field of view. For example, in one embodiment, the output subsystem 106 includes a display of the word "SLOW" that is illuminated with a red flashing light in response to receiving a moving object detection signal. In one embodiment, the vehicle safety system depicted in FIG. 2 is operable as a night pedestrian detection system. When the computer vision system 100 detects a moving pedestrian 105 in the path of the vehicle 101, the output subsystem produces a warning signal to alert the driver.

Figure 3:
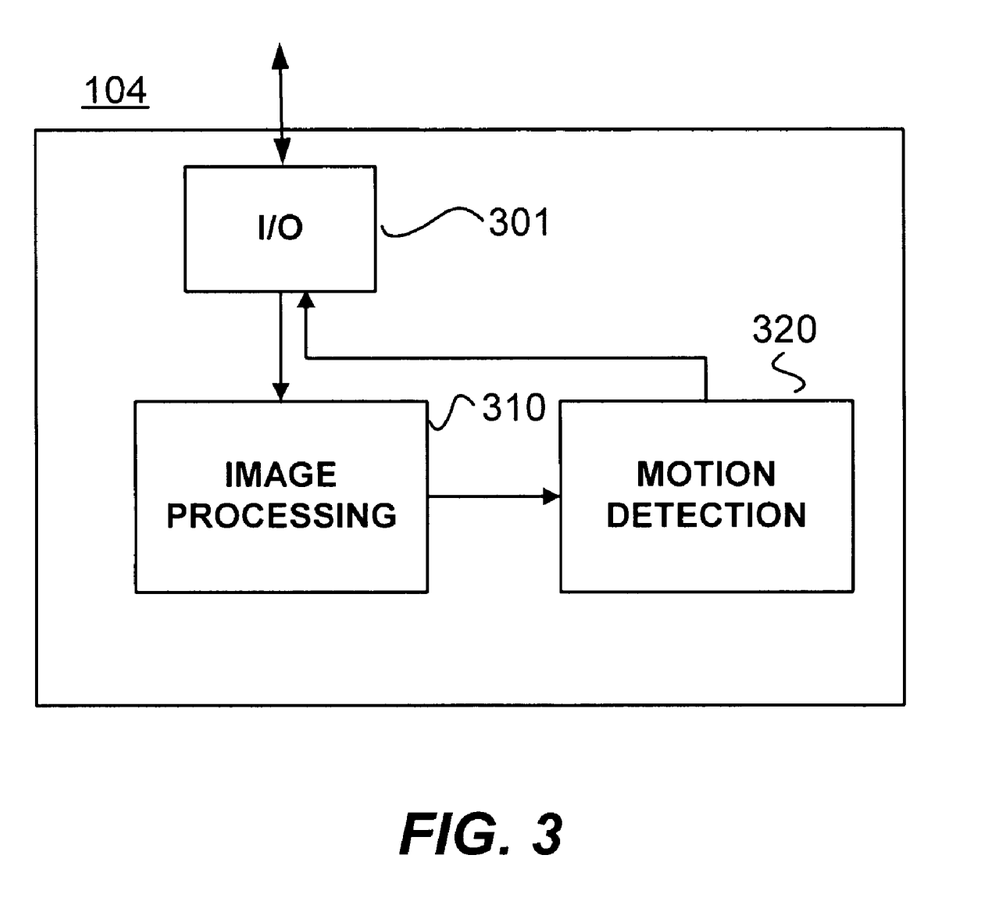
FIG. 3 is a block diagram of one embodiment of a computing subsystem.

Now referring to FIG. 3, a block diagram of one embodiment of a computing subsystem 104 is shown. The computing subsystem 104 includes several computing modules and input/output interfaces. In one embodiment, the computing subsystem 104 includes an image processing module 310 and a detection module 320. The computing modules operate on the image data received by a data input/output ("I/O") interface 301. The data I/O interface 301 receives the image data from the imaging subsystem 102. The data I/O 301 interface is operable over a wired or wireless connection.

The computing modules include or are implemented by computing hardware and/or software. For example, in one embodiment, a general-purpose programmable computer processor, with associated storage or memory, implements several computing modules. In another embodiment, a function specific embedded processor or microcontroller executes firmware to implement the computing modules. Yet another embodiment includes hardware logic circuits that implement the computing modules. It should be noted that other configurations of conventional data processing systems can also be used to configure the computing subsystem 104 for processing the image data based on the techniques described herein.

An image-processing module 310 processes the image data to determine the location of objects within the image. The image-processing module 310 also compares frames taken at different times to determine the location of the same objects at those different times by matching the objects. For each object, the image-processing module 310 produces a set of coordinates that identifies the position of the object on each frame. The object position or location information is sent to the detection module 320.

The detection module 320 evaluates the object location information and determines which of the objects in the image are moving objects. In addition, in one embodiment, the object detection module 320 also finds moving objects of particular interest or determines false positives based on pattern matching analysis. For example, in a pedestrian detection system, the object detection module 320 determines which of the moving objects correspond to pedestrians.

Figure 4A:
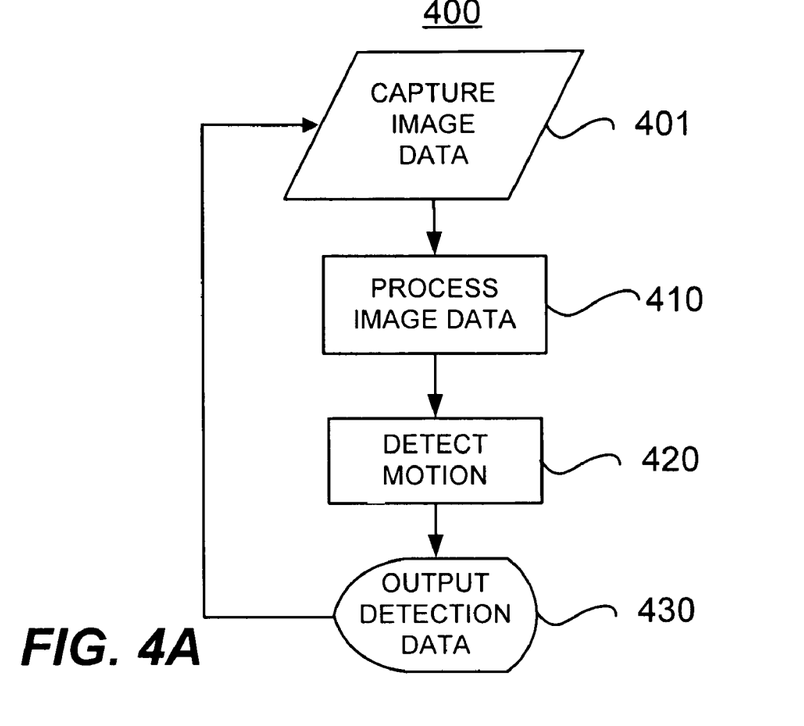
FIG. 4A is a flow chart of one embodiment of a moving object detection method.

Now referring to FIG. 4A, one embodiment of a moving object detection method 400 is shown. The image data is captured 401 and transmitted for processing. The image data is processed 410 to determine the location of objects of interest captured in the images. Once the objects are defined within the image data, the information is processed 420 to detect target moving objects within the images. A detection signal is output 430 if any target moving object is detected in the scene.

Image Capture

Figure 4B:
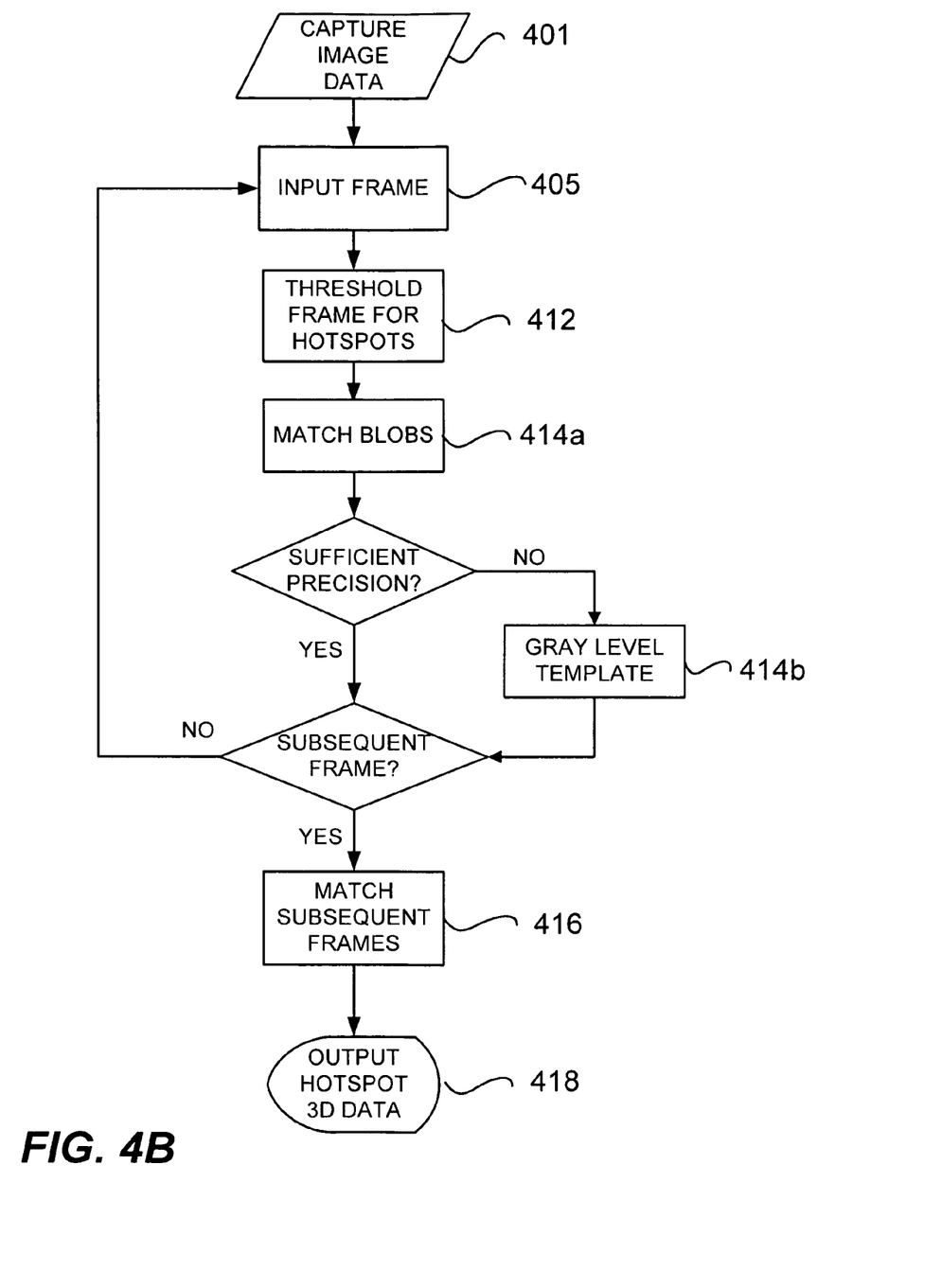
FIG. 4B is a flow chart of one aspect of one embodiment of a moving object detection method.

Now referring to FIG. 4B, a more detailed flow chart of one embodiment of a moving object detection method 400 is shown. The image data is captured 401 in a conventional way. As mentioned above, the image data includes typical image information and information sufficient to determine the distance to the objects in the scene. In one embodiment, the image data includes video frames of a scene captured by two infrared-sensitive cameras, a left camera and a right camera. Two frames, a left frame and a right frame, are received for each time interval, e.g., using thirty-frame-per-second ("fps") video, the system receives two simultaneous frames every one thirtieth of a second, one from each camera. The image data in each frame is 720×480-pixel gray scale digital infrared image.

Infrared images are a representation of electromagnetic energy sensed from the imaged scene. In a scene, different objects emit or reflect infrared energy in relation to their heat reflection/emission characteristics. Generally, infrared image data represents heat levels in a gray scale: hottest objects in white and coldest objects in black. The appearance of the scene taken by infrared-sensitive cameras at night is quite different from that taken during daytime. Due to the heat-sensitive nature of the sensor, heat emitting objects, e.g., humans, animals, engines, and the like, appear brighter than surrounding objects. By contrast, during daytime, infrared emissions are also related to the reflective nature of the objects, e.g., color, material, and the like. Thus, the use of this imaging technique during night time aids in the detection of objects that are likely to be moving on their own, i.e., heat emitting objects. Objects then are not capable of moving by reflect large amounts of heat or other infrared energy could look the same as other objects capable of moving in a day time improved image. However, such objects are more easily distinguished when the image is captured at night or under low illumination conditions.

Object Identification Within a Frame

In one embodiment, as the image data is captured, simultaneously captured frames are input 405 for image processing. For example, in a stereo vision system, the left and right frames of the same scene are input 405 for processing. Each frame is dynamically threshold 412 to detect hotspots in the image data. As mentioned above, heat-emitting objects are represented with lighter tones in the gray scale infrared image, thus, thresholding the frames facilities the identification of heat emitting objects within each frame. The choice of a threshold value has an impact on the number of feature points or objects obtained. The threshold is determined based on the overall mean of the whole infrared image. In one embodiment the threshold value of 205-Mean is used. The thresholding process provides groups of contiguous pixels or blobs that represent a heat emitting object.

Correspondence of Objects Between Simultaneous Frames

According to one embodiment, the next step involves matching 414 object blobs in the two simultaneous frames. The matched blobs show the correspondence between identified objects in the left and right frames of the same scene. This is an issue that is common to all conventional stereo-based methods and any conventional matching approach can be used. It should be noted that in embodiments using alternative depth sensing imaging subsystems this step is not required because such embodiments generate only one frame from one camera at a time.

In one embodiment, a two-stage approach is used to match 414 objects in the two stereo images. The first stage 414a uses the blobs of pixels corresponding to objects for faster correspondence determination. If a satisfactory solution is obtained in this stage, no further processing is required. If not, the second stage 414b uses gray scale information for the outline or shape of unresolved objects to determine correspondence.

The first stage 414a is generally sufficient for sparse scenes, where several hotspots are clearly defined and are separable from the background and from each other. The object correspondence determination by blob matching 414a provides sufficient precision for moving object determination under those circumstances. However, if the scene is cluttered and objects are not easily distinguishable from each other, gray scale level data is used for a finer coarse matching 414b.

Figure 4C:
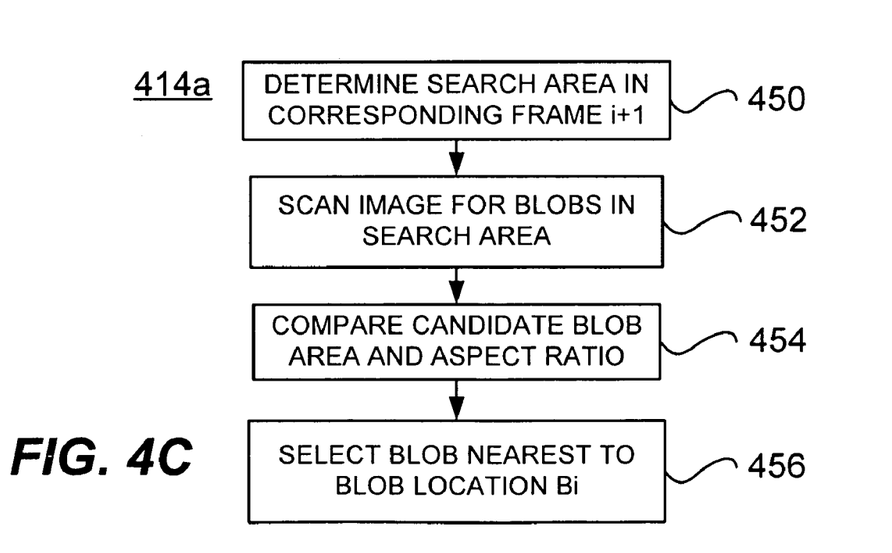
FIG. 4C is a flow chart of one embodiment an object blob matching method.

Now referring to FIG. 4C, a more detailed flow chart of one embodiment the object blob matching method 414a is shown. For a given pixel blob $B_i$, with centroid position ($x_i$, $y_i$) area $A_i$, with width $V_i$ and height $H_i$, its corresponding blob is searched according to the following criteria:

1. The rectangle area ($x_i-\Delta_x$, $y_i-\Delta_y$, $x_i+\Delta_x$, $y_i+\Delta_y$) is defined 450 as search the scope. Blobs inside this area are candidates for the blob matching process. In one embodiment, $\Delta_x$ is between 40 and 60 pixels; and $\Delta_y$ is between 20 and 30 pixels. The selection of $\Delta_x$, $\Delta_y$ is determined by the maximal moving speed of the object being detected.
2. In the search area, the image is scanned 452 for blobs. When a blob is found, its area and aspect ratio are compared 454 with the original blob $B_i$. Only blobs exceeding a threshold, e.g., with an area in the range of $(1\pm0.5)A_i$ and aspect ratio in the range of $(1\pm0.1)W_i/H_i$, are qualified. From the qualified blobs in the frame, the blob nearest to the $B_i$ location of the corresponding blob is selected 456.

Figure 5:
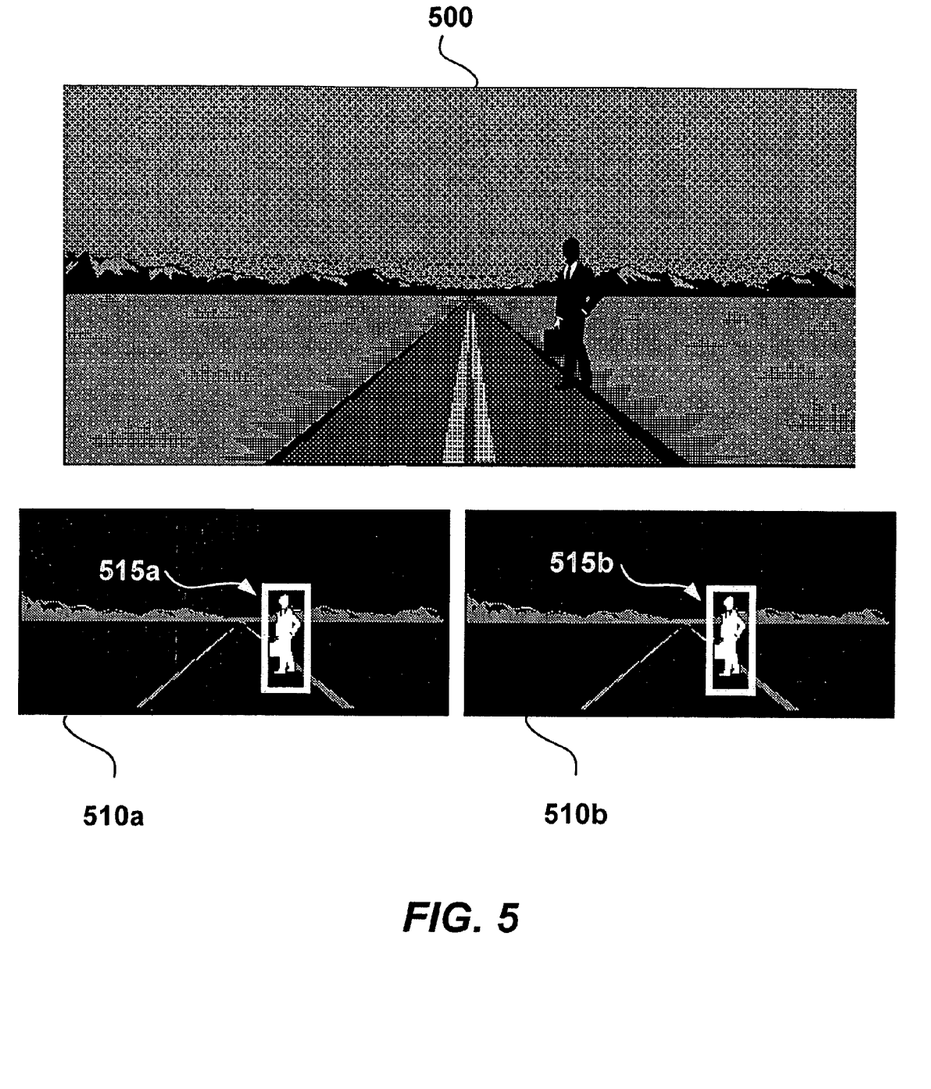
FIG. 5 shows a sample scene where corresponding blob pairs have been successfully matched in each of the left and right stereo frames.

This method works well for the environment with a few sparsely distributed hotspots inside the image view. For example, FIG. 5 shows sample scene 500 where corresponding blob pairs 515a and 515b have been successfully matched in each of the left 510a and right 510b stereo frames.

As mentioned above, the second stage 414b is processed when the scene environment is crowded; it becomes difficult to separate hotspots or find pairs of objects with similar shapes based on pixel blobs. In these situations, the first stage 414a does not provide sufficiently accurate results. In the second stage 414b, the gray scale image data is processed based on gray level template matching algorithms. The second stage 414b is applied either to the entire scene or only to object blobs whose counterparts are missing after first stage 414a processing. In one embodiment, the gray level matching algorithm is based on least squared difference, which is expressed as:

$$(x, y) \Leftarrow \arg\min \sum_{i=1}^{W} \sum_{j=1}^{H} (T(i, j) - I(i+x, j+y))^2$$

Here T is the template image with width W and height H, while I is the source image. By applying the hybrid-matching algorithm, a sufficient number of corresponding image pairs is found.

Accordingly, in one embodiment, the first stage 414a involves a computationally expedient wide-area search that ensures the accuracy by blob size and aspect ratio. If no sufficient accuracy is achieved, the second stage 414b uses a more time-consuming gray-level-matching algorithm. Avoiding exhaustive search and limiting the search area only to object blobs not recognized after the first stage 414a can reduce the computational cost of this algorithm.

For purposes of this description, the image coordinate system is such that the X and Y axes are parallel to the image plane, while the Z axis represents the translational direction. For the position of an object, the relationship to imaging subsystem parameters is:

$$x = f\frac{X}{Z}, y = f\frac{Y}{Z}$$

where (X, Y, Z) is the position of a three-dimensional ("3D") point and x, y, are the coordinate of the projected point on the image plane and $f$ the focal length of the cameras used in the imaging subsystem. In one embodiment, the Z distance or depth value is either provided by the imaging subsystem directly in the image data. In an alternative embodiment, the Z distance is calculated from the image data, e.g., from stereo images.

In one embodiment using stereo vision, once the blobs are identified and matched with respect to simultaneous left and right frames for scene i, each blob's image coordinates, ($x_L^i$, $Y_L^i$) and ($x_R^i$, $y_R^i$) are recorded. Then for each blob, the depth value (z) is calculated based on x disparity. In, another recorded, the depth value for each blob is calculated as the average depth value for the pixels within each blob. Accordingly, the resulting information after the image processing of the frame or frames for the initial scene i, is a blob and the 3D location of its centroid point P=(X, Y, Z)$^t$ for each hotspot or object in the scene i corresponding to time t.

Correspondence of Objects Between Subsequent Frames

Referring back to FIG. 4B, once the object hotspots are identified 412 and matched 414 in the simultaneous left and right frames, the same matching process is repeated for subsequent frames of scene i+1 taken at a different time. For example, in one embodiment, frames are matched every 10 frames, which corresponds to ⅓ second for a video signal at 30 fps.

With blob information from scene i and i+1, blobs in scene i are matched 416 with corresponding blobs in subsequent scene i+1. A two stage approach is applied as described above. However, a rough horizontal position of a stationary blob in the subsequent frame i+1 is computed first (using the assumption that the camera moves straight in the z direction) as:

$$x_L^{i+1} = \frac{zx_L}{z - \Delta z}$$

The above formula estimates the new position of the blob in frame i+1 from which the two-stage approach used between left and right frames is applied with respect to subsequent frames. For this process, the blob search range takes into account the camera's speed with respect to the common frame of reference. The corresponding coordinates are defined as centroids for the first stage 414a blob matching method (when the blob is clearly a segmentable shape in the two images). Further, when the second stage 414b gray level matching method is used, the corresponding coordinates are used as the center for template matching. The slight pixel error associated with the corresponding coordinates determined by blob centroids due to blob shape differences in different frames has little influence on the estimation of the new position by the above technique. For example, if there is 3-pixels error in the x disparity for a blob, there will be less than one pixel error in the estimation of the new position for frame i+1.

After the subsequent scene matching 416, three-dimensional coordinates for blob centroid points are recorded for each of the candidate objects or hotspots imaged in the scenes. This information is output 418 for detection of moving objects.

Independent Motion Detection

As described above, all objects in the scene appear to be moving in the image because the imaging subsystem is on a moving platform. However, independently moving objects often have movement patterns different from those of stationary objects, whose apparent movement is induced by the movement of the platform. In a scene taken from a moving platform at two points in time (t and t+1), the same object appears at different positions in frame i (taken at time t) and i+1 (taken at time t+1), due to a combination of the following reasons:

(1) Platform's translational motion;
(2) Platform's rotational motion around the X axis;
(3) Vehicle's rotational motion around the Y axis; and
(4) Independent object's motion The independent motion detection algorithms compensate position differences caused by 1, 2, and 3 above. If the object still appears at a different location after compensation, then the object's change in location is likely to result from the object's own independent motion. It should be noted that for simplicity, in one embodiment, the platform's rotational motion around the Z axis, in the direction of the motion, is not considered. Generally, the Z axis rotation is minimal in a translational moving platform, such as an automobile, and assuming it to be zero does not generate much of an error.

The instantaneous platform-induced motion of the system has two types of components: a translational component $T=(t_x, t_y, t_z)^t$ and a rotational component $\Omega=(\omega_1, \omega_2, \omega_3)^t$. The 3D instantaneous motion of a 3D point $P=(X, Y, Z)^t$ with respect to the background or common frame of reference is represented by the vector resultant from the cross product of the platform-induced motion and the current point location:

$$V = -T - \Omega \times P$$

The velocity equation can be also obtained by taking the derivative of position equations shown above. The resulting equations are:

$$\dot{x} = \frac{f\dot{X}}{Z} - \frac{fX\dot{Z}}{Z^2} = \frac{f\dot{X} - x\dot{Z}}{Z}, \quad \dot{y} = \frac{f\dot{Y} - y\dot{Z}}{Z}$$

This differential equations can be re-written based on the position equations and the motion velocity vector equation above. Accordingly, the velocity equations for a point P is given by:

$$\dot{x} = \frac{1}{Z}(-ft_x + xt_z) + \omega_3 y + \frac{xy}{f}\omega_1 - \frac{x^2 \omega_2}{f} - f\omega_2$$

$$\dot{y} = \frac{1}{Z}(-ft_y + yt_z) - \omega_3 x - \frac{xy}{f}\omega_2 + \frac{y^2 \omega_1}{f} + f\omega_1$$

Equivalently, this information can be represented in matrix form as:

$$\begin{bmatrix} \dot{x} \\ \dot{y} \end{bmatrix} = \begin{bmatrix} \frac{xy}{f} & \left(-f - \frac{x^2}{f}\right) & y & -\frac{f}{Z} & 0 & \frac{x}{Z} \\ f + \frac{y^2}{f} & -\frac{xy}{f} & -x & 0 & -\frac{f}{Z} & \frac{y}{Z} \end{bmatrix} \begin{bmatrix} \omega_1 \\ \omega_2 \\ \omega_3 \\ t_x \\ t_y \\ t_z \end{bmatrix}$$

To simplify this equation, in one embodiment, the systems assumes $t_x=t_y=0$ and $\omega_3=0$ because a translational moving platform does not move sideways or in the up/down direction. Accordingly, the location of the three dimensional point after its motion for a predetermined period of time is the following:

$$x' = x + \Delta_I + \Delta_{II} + \Delta_{III} + \epsilon$$

In this representation, x is the point's (P) projection on the image plane (or the image) before the platform-induced motion, i.e., in an initial frame. Similarly, x' represents P's projection on the image after some time during which the projection of the point moved due to the platform-induced motion. Since we assumed $t_x=t_y=0$, the only change due to translational motion is represented as $$\Delta_I = x \frac{t_z}{Z}.$$

Rotation around the X axis causes a change in projection given by $\Delta_{II} = xy\Omega_1/f$. Similarly, rotation around the Z axis causes a change in projection given by $\Delta_{III} = -(x^2/f + f)\omega_2$. In this representation, $\epsilon$ defines the error term calculated from the estimated location of the point based on the platform-induced motion and the actual location of the point in the subsequent frame.

In an ideal case, $\epsilon=0$ for a static points because static points do not have a motion of their own. Accordingly, static points appear in the location where they are expected based on the platform's motion. However, due to simplifications and image processing accuracy limitations, even stationary points exhibit some variation from frame to frame. Similarly, nonzero values for $\epsilon$ would ideally indicate that the point corresponds to an independently moving object, i.e., the location of the point does not match the estimation based on the platform's motion. However, in practice, some threshold error is allowed for other sources of errors. Accordingly, the following measure is used by the motion detection module to make a stationary/moving determination for every point in the image:

$\epsilon$<threshold => stationary object $\epsilon$>threshold => moving object

The major reason why $\epsilon$ is nonzero, even for a stationary object, is that the coordinate of the centroid of a blob is used to represent the position of the object. However, segmentation usually produces slightly different results in different frames. Thus, the centroids of the same blob in different frames do not necessarily coincide.

Using ego-motion calculations, the relevant terms, $t_z$, $\omega_1$, $\omega_2$, can be computed to provide an estimated x'−x due to the platform-induced motion. However, ego-motion calculations are complex and computationally expensive. Accordingly, the x'−x estimated value is computed without explicitly computing the $t_z$, $\omega_1$, $\omega_2$ components.

Figure 6:
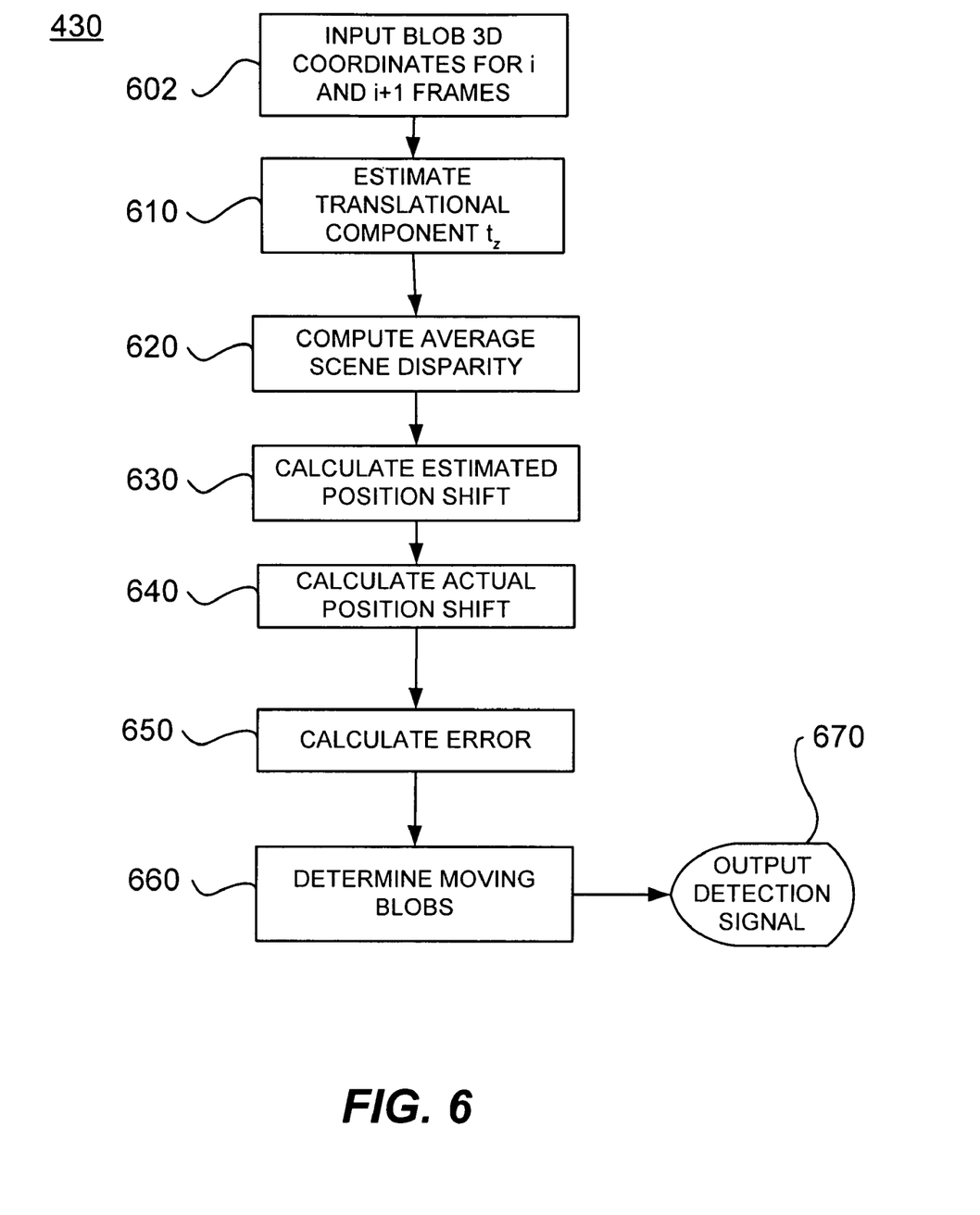
FIG. 6 is a flow chart of one embodiment of a moving object detection method.

Now referring to FIG. 6, a flow chart of one embodiment of a moving object detection method 430 is shown. For the translational component $t_z$, an estimated value is derived 610 from a component of the moving platform itself, e.g., a vehicle's speedometer or the like. For the rotational components, $\omega_1$ and $\omega_2$, a second approximation is computed 620 to replace the actual values of the $\Delta_{II}+\Delta_{III}$ effect. Instead of calculating the rotational components, an average scene disparity $\overline{\Delta}_{II,III}$ is computed 620 from points in the image data likely to be stationary.

In order to locate objects likely to be stationary, points corresponding to objects that are away from the image center are used. In a typical application, objects away from the center of the image are likely to correspond to background objects because the imaging subsystem are not directly focused on them. For example, in an automobile pedestrian detection system embodiment, peripheral objects are likely to be man-made objects, such as telephone poles, bridges, and buildings.

Accordingly, in one embodiment, for calculating the average scene disparity ($\overline{\Delta}_{II,III}$), the following heuristic is used to find the stationary objects. The frame is divided vertically into three parts. The upper part is assumed to contain segments of stationary objects, which are used for the average scene disparity calculation 620. The bottom part is mostly the ground, and is not used because it is difficult to find feature points for matching. Additionally, it should be noted that based on this heuristic, the middle part of the image is likely to contain the objects of interest, e.g., pedestrians, moving vehicles, and other moving objects. Accordingly, in one embodiment, the search zone for moving objects is narrowed to the middle part of the image.

The average scene disparity $\overline{\Delta}$ is computed from the centroid position shift of stationary objects as determined from image processing of subsequent frames. This method cuts down many of the conventional time consuming and resource intensive computation steps that are necessary to find ego-motion such as solving a linear equation. The average scene disparity is defined as:

$$\overline{\Delta}_{II,III} = \frac{1}{n}\sum_{i=1}^{n}[(x_i' - x_i) - \Delta_I]_{object\ i}$$

Here x and $x_i$ are the positions of i-th stationary object in the image before (at time t) and after the platform-induced motion (time t+1), respectively, and n is the number of stationary objects used for the calculation. Instead of calculating the actual values for $\Delta_{II}+\Delta_{III}$ for each object independently, the average ($\overline{\Delta}$) for stationary objects is computed from the position data derived through image processing. With this estimation, the average scene disparity $\overline{\Delta}$ provides sufficient precision to compensate for the rotation and drift components of the position shift ($\omega_1$, $\omega_2$) It should be noted that even if some or all of the objects, whether likely to be stationary or not, are used, the average scene disparity would still be sufficiently accurate to provide useful results.

To detect moving objects, every candidate point in the search area is initially assumed to be a stationary point. With an empirically determined average scene disparity $\overline{\Delta}_{II,III}$ mostly corresponding to stationary objects, and assuming the error value $\epsilon$ to be zero (ideal condition for stationary objects), the x'−x estimated value for each point in the search area is calculated 630 from the following equation:

$$x'-x=\Delta_1+\overline{\Delta}_{II,III}$$

In addition, the actual position shift x'−x between subsequent frames is calculated 640 for each candidate point or object from the image processing blob 3D coordinates. The error $\epsilon$ is calculated 650 from the difference between the estimated and actual position shift values. The computed value for $\epsilon$ for each candidate object is:

$$(x'-x)_{actual}-(x'-x)_{estimated}=\epsilon$$

Since the estimated position shift $(x'-x)_{estimated}$ was calculated 630 assuming the points to be stationary, the error for moving points is much larger than the error for stationary points. As described above, the moving objects are detected 660 based on an empirical threshold value for $\epsilon$:

$\epsilon$<threshold=>stationary object $\epsilon$>threshold=>moving object

Upon the detection of one or more moving objects, motion detection data is provided 670 to the output subsystem. In one embodiment, the detection 660 further includes an object type identification process further described below.

The choice of the threshold for $\epsilon$ is based on the speed of the moving object and the distance of the object to the vehicle. The faster the vehicle is, the greater the value of $\epsilon$ becomes. To find a suitable threshold value for the error term $\epsilon$, the difference between the estimated position and actual position of stationary points is determined. The points are on the range of view angle of the camera system and certain distance from it. In one embodiment using a stereo camera system, the view angle is −13°~13°. In this embodiment, objects at a distance of 10~35 meters from the platform are the likely candidates to be moving objects. The difference between the estimated positions for these points and actual positions detected in a subsequent frame are calculated.

In one embodiment, the vision system 100 is used in a pedestrian detection system in a vehicle. Table 1 shows a number of $\epsilon$ values corresponding to several extreme cases when the vehicle rotated around the X and Y axes at difference angles. This table shows that the effect of $\Delta_{II}+\Delta_{III}$ on motion flow is not negligible. Values for $\epsilon$ are calculated at that position under different rotation speeds. As shown in this table, the smaller the rotation is, the smaller the value of $\epsilon$ is (i.e., the detection is more sensitive).

TABLE 1

| $\omega_1$ (rad/s) | $\omega_2$ (rad/s) | X (pixels) | Y (pixels) | $\epsilon$ (pixels) |
|---|---|---|---|---|
| 0.15 | 0.15 | 360 | 0 | 4 |
| 0.15 | 0.45 | 360 | 0 | 9 |
| 0.15 | 0.75 | 360 | 0 | 15 |
| 0.30 | 0.30 | 360 | 0 | 11 |
| 0.30 | 0.45 | 360 | 0 | 10 |
| 0.30 | 0.75 | 360 | 0 | 16 |
| 0.75 | 0.90 | 360 | 0 | 22 |
| 0.90 | 0.90 | 360 | 0 | 21 |

In Table 1, the comparison of $\epsilon$ is done in time intervals of ⅓ of a second for objects at a depth value of 15 meters. The analysis is based on a vehicle speed of 40 m/s. X and Y are object's coordinates in the image plane.

The object horizontal and vertical offset from the image center influences the detection performance of the system.

For example, in a vehicle pedestrian detection system embodiment, for nearly straight motion of the vehicle with small rotation ($\omega_1$=0.15 rad/s $\omega_2$=0.15 rad/s), the error $\epsilon$ is as small as 10 pixels, even at the leftmost and rightmost positions of the image plane. In such a case, there is hardly any difference in pixel value between ideal calculation and the approximate calculation. When the vehicle is turning at a much larger rate ($\omega_1$=0.90 rad/s $\omega_2$=0.90 rad/s), its influence becomes greater, yet $\epsilon$ is still within tolerance for the stationary/moving determination. As shown in Table 1, rotation angles have a non-negligible influence on $\epsilon$. Based on these observations, the search range for stationary objects is limited to the depth values with smaller discrepancy, between 15 and 30 meters from the camera system. Additionally, as mentioned above, the search area is also narrowed to objects that are away from the image edges. These limitations reduce the maximal value of $\epsilon$. In one embodiment, the threshold value for motion/stationary determination is 25 pixels. Accordingly, any object with $\epsilon$ value larger than 25 pixels is treated as a moving object.

Object Type Identification

In one embodiment, the moving object detection 660 is further refined based on the type of object detected. For example, in a pedestrian detection embodiment, only human pedestrians are the desired target object for the detection system. Accordingly, once moving objects are detected, non-human objects, e.g., oncoming traffic, are discarded. Usually, it is not straightforward to identify if a detected moving hotspot is a human (or part of a human) or some other object. A number of conventional approaches for image identification are available.

In one embodiment, the aspect ratio and size of a blob corresponding to a detected moving object are compared. This approach is used to detect human targets. Typically, blob corresponding to a car (or part of a car) is much larger in size and elongated in the horizontal direction, whereas the human shape is longer in the vertical direction. Thus, in one embodiment for moving vehicle detection, the larger and elongated blobs are indicated as detected while the smaller and longer blobs are discarded. Similar heuristics are used for other objects of interest with particular sizes and/or aspect ratios.

However, using aspect ratio and size alone is not always sufficient to reject false-positives. In such a case, shape information has to be taken into consideration. Shape information is used in a pattern classifier system. A candidate target object is given to a shape analysis module that analyzes the object's shape based on its image and compares it to a stored training set. The stored training set corresponds to images of shapes that are characteristic of the type of target object of interest, e.g., humans, animals, vehicles, or the like. For example, in one embodiment, a Support Vector Machine (SVM) is used for this purpose. The SVM is a classification method that calculates the boundary (support vectors) between two sets of high dimensional vectors (training stage) and uses these support vectors to classify vectors from a similar source (test stage). The number of support vectors generated and the detection rate are used to evaluate the efficiency of different training data sets, e.g., gray-scale vs. binary, or upper body vs. whole body, for pedestrian detection. Generally, the recognition of a human body using the gray scale self trained SVM is quite successful: it can always recognize the right candidates, and works fine if there is only minor difference between the training set and the application data.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer vision system for detecting moving objects from a moving platform, the system comprising:
   an imaging subsystem for capturing scene image data from the moving platform at a plurality of times, the image data comprising information for deriving a depth measure for objects in the scene, the imaging subsystem for operation under low illumination conditions;
   a computing subsystem communicatively coupled to the imaging subsystem for receiving the image data and for providing motion detection data indicating the detection of independently moving objects within the scene, the computing subsystem configurable to process the image data to determine three-dimensional coordinates for points corresponding to a plurality of objects in the scene and further comprising:
      an average scene disparity module configurable to calculate an average scene disparity from changes in three-dimensional coordinates for a first subset of objects in the scene likely to be stationary;
      an estimated position shift module configurable to calculate an estimated position shift for each object in a second subset of objects in the scene based at least in part on the average scene disparity;
      an actual position shift module configurable to calculate an actual position shift for each object in the second subset of objects in the scene based in part on the three-dimensional coordinates for said second subset of objects;
      a position error module configurable to calculate a position error for each object in the second subset of objects in the scene based, at least in part, on the difference between the estimated position shift and the actual position shift for each object; and
      an object detection module configurable to detect at least one moving object from the objects in the second subset of objects based, at least in part, on a comparison between the position error for said at least one object and an empirically determined maximum threshold value; and
   an output subsystem coupled to the computing subsystem for receiving the motion detection data and for providing a motion detection signal in response to the detection of one or more independently moving objects.

2. The computer vision system of claim 1, wherein the imaging subsystem further comprises a plurality of infrared-sensitive cameras.

3. The computer vision system of claim 1, wherein the moving platform is a vehicle comprising a plurality of wheels for operation over roads.

4. The computer vision system of claim 3, wherein the output subsystem is further coupled to a safety system in the vehicle for alerting a vehicle operator in response to receiving the motion detection signal.

5. A computer based method for detecting moving objects from a moving platform under low illumination conditions, the method comprising the steps of:

capturing image data of a scene from a moving platform at two or more points in time, the image data including low illumination imaging information and depth related information;

processing the image data to determine three-dimensional coordinates for points corresponding to a plurality of objects in the scene;

calculating an average scene disparity from changes in the three-dimensional coordinates for a first subset of objects in the scene likely to be stationary;

calculating an estimated position shift for each object in a second subset of objects in the scene based at least in part on the average scene disparity;

calculating an actual position shift for each object in the second subset of objects in the scene based, at least in part, on the three-dimensional coordinates for said second subset of objects;

calculating a position error for each object in the second subset of objects in the scene based, at least in part, on the difference between the estimated position shift and the actual position shift for each object; and detecting at least one moving object from the objects in the second subset of objects based, at least in part, on a comparison between the position error for said at least one object and an empirically determined maximum threshold value.

6. The method of claim 5, wherein the depth related information comprises image data for a left frame and a right frame of the same scene.

7. The method of claim 5, wherein the image data comprises infrared-sensitive information for a first frame corresponding to the scene at a first point in time and for a second frame corresponding to the scene at a second point in time, and further wherein processing the image data comprises:

thresholding the image data to find one or more blobs of pixels in each frame corresponding to one or more heat emitting objects in the scene;

matching the blobs found in the first frame with the blobs found in the second frame corresponding to the same heat emitting objects; and determining a three-dimensional coordinate set for each blob as a point in the blob.

8. The method of claim 7, wherein matching the blobs further comprises:

a first matching stage based on comparing blob at least blob area for each blob in a similar location within the first and the second frames; and a second matching stage based on gray level template analysis, wherein gray level information within the image data for blobs in similar a location within the first and second frames are compared to determine their similarity.

9. The method of claim 5, wherein calculating the average scene disparity further comprises calculating a translational component based at least in part in a measured value provided by a speed measuring device.

10. The method of claim 5, wherein the maximum threshold value is based, at least in part, on a speed of the moving object and a distance of the moving object to the moving platform.

11. The method of claim 5, wherein detecting at least one moving object further comprises performing a pattern-matching analysis of the at least one object to determine whether the object matches a target object type.

12. The method of claim 11, wherein the target object type is human.

13. A computer system for detecting moving objects from a moving platform under low illumination conditions, the system comprising the steps of:

means for capturing image data of a scene from a moving platform at two or more points in time, the image data including low illumination imaging information and depth related information;

means for processing the image data to determine three-dimensional coordinates for points corresponding to a plurality of objects in the scene;

means for calculating an average scene disparity from changes in the three-dimensional coordinates for a first subset of objects in the scene likely to be stationary;

means for calculating an estimated position shift for each object in a second subset of objects in the scene based at least in part on the average scene disparity;

means for calculating an actual position shift for each object in the second subset of objects in the scene based, at least in part, on the three-dimensional coordinates for said second subset of objects;

means for calculating a position error for each object in the second subset of objects in the scene based, at least in part, on the difference between the estimated position shift and the actual position shift for each object; and means for detecting at least one moving object from the objects in the second subset of objects based, at least in part, on a comparison between the position error for said at least one object and an empirically determined maximum threshold value.

14. The system of claim 13, wherein the depth related information comprises image data for a left frame and a right frame of the same scene.

15. The system of claim 13, wherein the image data comprises infrared-sensitive information for a first frame corresponding to the scene at a first point in time and for a second frame corresponding to the scene at a second point in time, and further wherein the means for processing the image data comprises:

means for thresholding the image data to find one or more blobs of pixels in each frame corresponding to one or more heat emitting objects in the scene;

means for matching the blobs found in the first frame with the blobs found in the second frame corresponding to the same heat emitting objects; and means for determining a three-dimensional coordinate set for each blob as a point in the blob.

16. The system of claim 13, wherein the maximum threshold value is based, at least in part, on a speed of the moving object and a distance of the moving object to the moving platform.

17. A pedestrian detection system in a vehicle for assisting a driver to detect pedestrians and other moving objects in a path of the vehicle during low illumination conditions, the pedestrian detection system comprising:

an infrared stereo vision module for capturing scene image data at a plurality of times, the image data comprising information for deriving a depth measure for objects in the scene, the infrared stereo vision module comprising a plurality of infrared-sensitive cameras configured to operate under low illumination conditions;

a data processing module communicatively coupled to the infrared stereo vision module for receiving the image data and for providing motion detection data indicating the detection of independently moving objects within the scene, the data processing module configurable to process the image data to determine three-dimensional coordinates for points corresponding to a plurality of objects in the scene and further comprising:

an average scene disparity module configurable to calculate an average scene disparity from changes in three-dimensional coordinates for a first subset of objects in the scene likely to be stationary;

an estimated position shift module configurable to calculate an estimated position shift for each object in a second subset of objects in the scene based at least in part on the average scene disparity;

an actual position shift module configurable to calculate an actual position shift for each object in the second subset of objects in the scene based in part on the three-dimensional coordinates for said second subset of objects;

a position error module configurable to calculate a position error for each object in the second subset of objects in the scene based, at least in part, on the difference between the estimated position shift and the actual position shift for each object; and an object detection module configurable to detect at least one moving object from the objects in the second subset of objects based, at least in part, on a comparison between the position error for said at least one object and an empirically determined maximum threshold value; and an output interface coupled to the data processing module for receiving the motion detection data and for providing an output signal to a safety system processing unit within the vehicle for providing an alert signal to the driver in response to the detection of one or more pedestrians.

18. The pedestrian detection system of claim 17, wherein the safety system processing unit within the vehicle for providing an alert signal to the driver as one of an audible signal, a visually detectable signal, or a vehicle speed control signal.

* * * * *